(12) United States Patent
Wertsman et al.

(10) Patent No.: US 7,317,523 B2
(45) Date of Patent: Jan. 8, 2008

(54) METHOD FOR CALIBRATING A METROLOGY TOOL AND A SYSTEM

(75) Inventors: Nadav Wertsman, Jerusalem (IL); Ovadya Menadeva, Modiin (IL)

(73) Assignee: Applied Materials, Israel, Ltd., Rehovot (IL)

( * ) Notice: Subject to any disclaimer, the term of this patent is extended or adjusted under 35 U.S.C. 154(b) by 219 days.

(21) Appl. No.: 11/128,952

(22) Filed: May 12, 2005

(65) Prior Publication Data

US 2006/0187447 A1    Aug. 24, 2006

Related U.S. Application Data

(60) Provisional application No. 60/656,322, filed on Feb. 24, 2005.

(51) Int. Cl.
*G01J 1/10* (2006.01)

(52) U.S. Cl. ................................. 356/243.1; 250/492.2

(58) Field of Classification Search .. 356/243.1–243.4, 356/601, 625–630, 634–636, 243; 250/559.1–559, 250/306–311, 491.1–492.22, 442.11; 216/52; 438/5–18
See application file for complete search history.

(56) References Cited

U.S. PATENT DOCUMENTS

| | | | |
|---|---|---|---|
| 6,670,610 B2 * | 12/2003 | Shemesh et al. | 250/309 |
| 2005/0237542 A1 * | 10/2005 | Rotsch | 356/636 |

\* cited by examiner

*Primary Examiner*—Gregory J. Toatley, Jr.
*Assistant Examiner*—Tri Ton
(74) *Attorney, Agent, or Firm*—Tarek N. Fahmi

(57) ABSTRACT

A method for calibrating a metrology tool, the method includes: determining a relationship between an upper portion of a milled reference structural element and between a lower portion of the milled reference structural element; and defining a calibration parameter in response to the relationship. A metrology system that includes: a miller adapted to mill a reference structural element; and a measurement device adapted to determine a relationship between an upper portion of a milled reference structural element and between a lower portion of the milled reference structural element; wherein the metrology system is further adapted to define a calibration parameter in response to the relationship.

12 Claims, 7 Drawing Sheets

CD-SEM
20

FIB
30

METHOD FOR CALIBRATING A METROLOGY TOOL AND A SYSTEM

RELATED APPLICATIONS

This application claims priority to U.S provisional patent application Ser. No. 60/656,322, filed Feb. 24, 2005.

FIELD OF THE INVENTION

This invention relates to metrology systems and methods in determining features structural elements such as lines, contacts, trenches and the like, of measure objects such as but not limited to semiconductors wafers, reticles, Thin Film Heads, MEMS, MOEMS.

BACKGROUND OF THE INVENTION

Integrated circuits are very complex devices that include multiple layers. Each layer may include conductive material, isolating material while other layers may include semi-conductive materials. These various materials are arranged in patterns, usually in accordance with the expected functionality of the integrated circuit. The patterns also reflect the manufacturing process of the integrated circuits.

Integrated circuits are manufactured by complex multi-staged manufacturing processes. During this multi-staged process resistive material is (i) deposited on a substrate/layer, (ii) exposed by a photolithographic process, and (iii) developed to produce a pattern that defines some areas to be later etched.

Various metrology, inspection and failure analysis techniques evolved for inspecting integrated circuits both during the fabrication stages, between consecutive manufacturing stages, either in combination with the manufacturing process (also termed "in line" inspection techniques) or not (also termed "off line" inspection techniques). Various optical as well as charged particle beam inspection tools and review tools are known in the art, such as the VeritySEM™, Compluss™ and SEMVision™ of Applied Materials Inc. of Santa Clara, Calif.

Charged particle beam inspection tools, metrology tool or FIB tools are also manufactured by additional vendors, such as but not limited to FEI Company of Hilsboro, Oreg., KLA-Tencor Inc. of San Jose, Calif., Hitachi Inc. of Tokyo, Japan, and the like.

Various prior art CD-SEMs and method for measuring critical dimensions are illustrated in the following U.S. patent applications which are incorporated herein by reference: U.S. patent application publication number 20030015699 of Su, titled "Integrated critical dimension control for semiconductor device manufacturing"; U.S. patent application publication number 20050048654 of Wu, titled "Method of evaluating reticle pattern overlay registration"; U.S. patent application publication number 20040173746 of Petrov, et al., titled "Method and system for use in the monitoring of samples with a charged particles beam"; U.S. patent application publication number 20040056207 of Petrov, et al., titled "Deflection method and system for use in a charged particle beam column"; U.S. patent application publication number 20030218133 of Petrov, et al., titled "Charged particle beam column and method for directing a charged particle beam"; U.S. patent application publication number 20030209667 of Petrov, et al., titled "Charged particle beam apparatus and method for inspecting samples;

Manufacturing failures may affect the electrical characteristics of the integrated circuits. Some of these failures result from unwanted deviations from the required dimensions of the patterns. A "critical dimension" is usually the width of a patterned line, the distance between two patterned lines, the width of a contact and the like.

One of the goals of metrology is to determine whether the inspected objects includes deviations from these critical dimensions. This inspection is usually done by charged particles beam imaging that provide the high resolution required to measure said deviations.

A typical measured structural element is a line that has an upper portion (line top), a lower portion (line bottom) and two sidewalls. The measurement of the bottom width of the line involves measuring the top width of the line as well as measuring its sidewalls.

Measurement of a structural element line critical dimensions using only a top view (in which the electron beam that scans the line is perpendicular to the substrate) may result in faulty results, especially when one of the sidewalls has a negative sidewall angle such that an upper end of the sidewall obscures a lower end of that sidewall.

In order to address said inaccuracies CD-SEM tools that enable electronic tilt of an electron beam were introduced. NanoSEM 3D and VeritySEM of Applied Materials from Santa Clara, is a fully automated CD-SEM that has a column that allows electronic tilting as well as mechanical tilting of the scanning electron beam to scan the wafer surface with various tilt angles from several directions.

Some metrology methods include illuminating one side of a structural element, as well as illuminating its top and assuming that the structural element sidewalls are symmetrical. Another metrology method includes illuminating both sides of the structural element.

Multiple measurements have some disadvantages. First, they reduce the throughput of the inspection system, especially when the measurement involves changing the tilt of scanning electron beam. Such a change may require a de-Gauss stage, as well as an electron beam stabilization stage. A further disadvantage of multiple measurements results from degradation (for example shrinkage and carbonization) of the measured structural element, as well as unwanted charging of the measured structural element.

As the size of structural elements shrink the metrology tools are required to be more accurate.

There is a need to provide an efficient metrology method and system.

SUMMARY OF THE INVENTION

A method for calibrating a metrology tool, the method includes: determining a relationship between an upper portion of a milled reference structural element and between a lower portion of the milled reference structural element; and defining a calibration parameter in response to the relationship.

A metrology system that includes: a miller adapted to mill a reference structural element; and a measurement device adapted to determine a relationship between an upper portion of a milled reference structural element and between a lower portion of the milled reference structural element; wherein the metrology system is further adapted to define a calibration parameter in response to the relationship.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1-3 illustrate metrology systems according to various embodiments of the invention;

DETAILED DESCRIPTION OF THE DRAWINGS

Figure 2:
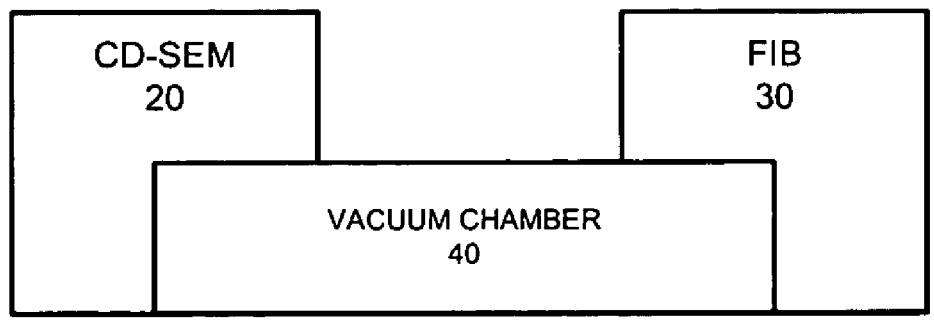

The invention provides a metrology system that includes a miller as well as a measurement device. According to various embodiments of the invention the miller and the measurement device can be integrated, partially integrated, share the same vacuum chamber, located close to each other or located at a distance from each other. An example of an integrated metrology tool can be found at U.S. Pat. No. 6,670,610 of Shemesh et al. which is incorporated herein by reference.

For simplicity of explanation it is assumed that the measurement device is a critical dimension scanning electron microscope (CD SEM) and that the miller is a FIB device. It is noted that this is not necessarily so. For example, the miller can be a scanning electron microscope using one or more beams of electrons. Yet for another example the measurement can be a FIB imager.

According to one embodiment of the invention the measurement device first selects one or more reference structural elements. The selection can be responsive to the location of the structural element, to the shape and size of the structural element and the like. Multiple reference structural elements can be selected in order to be milled and measured. Multiple measurements can improve the accuracy of the measurement, for example by averaging out measurement inaccuracies.

According to another embodiment of the invention, the selection of a reference structural element and/or the determination of the calibration parameter can be applied by devices other than the measurement device or the miller. For example, either one of these stages can be executed by a third device. For example, both miller and measurement tool can exchange information with a remote control system that has the capability to receive and provide information. The remote (or closely located) system can be located in the same FAB as the measurement tool or the miller, and can execute other tasks that relate to the manufacturing process and/or monitoring process of the inspected samples, but this is not necessarily so.

The selection of the structural element and/or determination of the calibration parameter can be made by another inspection tool and/or review tool.

According to an embodiment of the invention the reference structural element or its vicinity are marked in order to ease the location of that reference structural element by the measurement device and by the miller. The marking can be implemented by using charged particle beams such as electrons or ions. Usually such a marking process also involves injecting material at the vicinity of the marked area.

According to another embodiment of the invention the miller can mill a reference structural element in one location and the measurement device performs measurement of another point of the reference structural element. This embodiment does require to mark the reference structural (or its vicinity), as the measurement device can easily locate the milled reference structural element.

Typically, the location process involves receiving coordinates of the reference structural element and performing an image processing stage in order to locate the reference structural element. The image processing stage can include searching for a previously generated mark.

There are various prior art millers and measurement devices. The invention can make use of any prior art device and method for milling and measurement.

According to an embodiment of the invention the method includes performing an accurate top measurement by CD SEM to calibrate the FIB, accurately measuring, by the calibrated FIB, the bottom CD and then calibrating the CD SEM to accurately measure the bottom CD in high production throughput.

Figure 1:
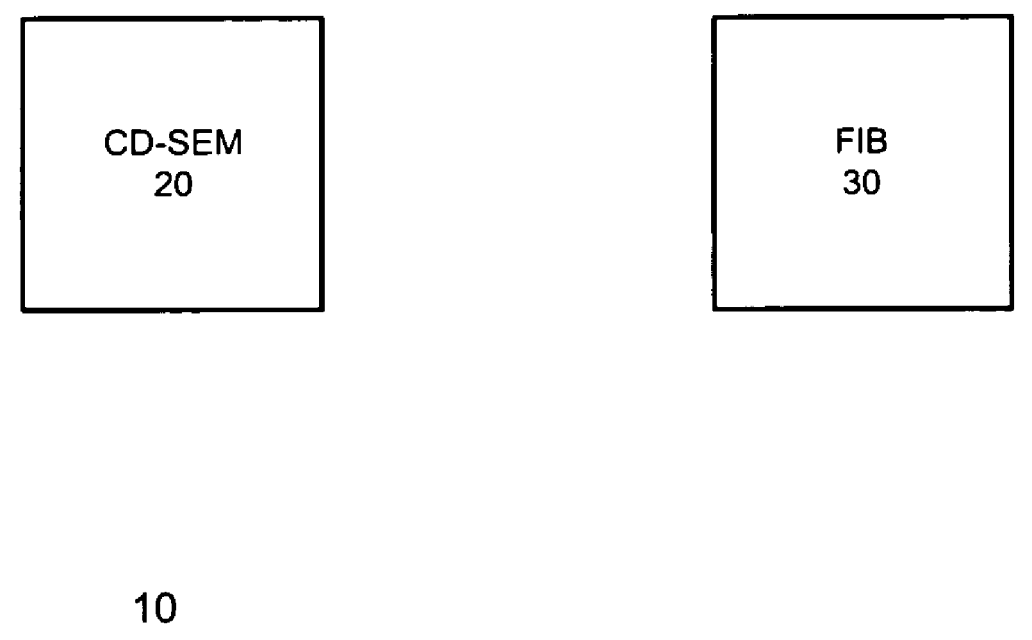

FIG. 1 illustrates a system 10 according to an embodiment of the invention. System 10 includes a CD-SEM 20 and a FIB 30. The CD-SEM 20 includes an electron beam generator, electron beam optics, stage, one or more detector and an image processor. FIB 30 includes an ion source, ion beam optics, a stage and a controller. It can also include one or more detector as well an image processor for generating FIB images. These tools do not share a common vacuum chamber but can exchange information.

The CD-SEM 20 includes a electron beam generator, electron beam optics, stage, one or more detector and an image processor. FIB 30 includes an ion source, ion beam optics, a stage and a controller. It can also include one or more detector as well an image processor for generating FIB images.

FIG. 2 illustrates a system 10' according to an embodiment of the invention. System 10' includes a CD-SEM 20 and a FIB 30 that share a common vacuum chamber 40.

Figure 3:
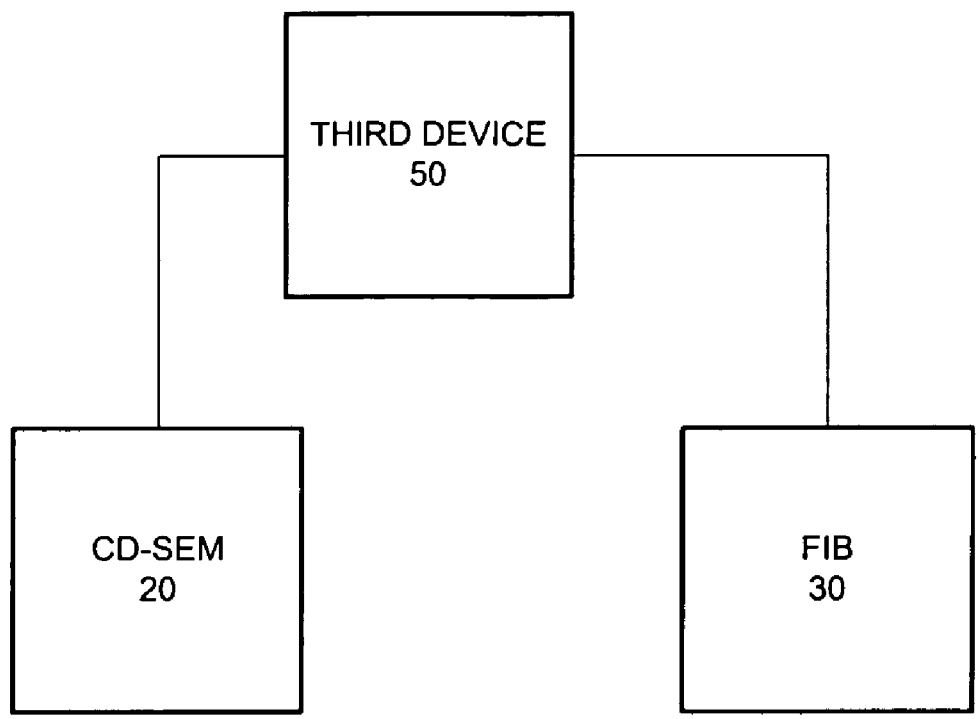

FIG. 3 illustrates a system 10" according to another embodiment of the invention. System 10" includes a CD-SEM 20 and a FIB 30 that are connected to a third device 50 that can determine the reference structural element.

According to other embodiments of the invention this third device 50 can alternatively or additionally determine the calibration parameter in response to measurements provided by the FIB 30 and CD-SEM 20.

It is noted that the system 10' or 10" can be connected to more than a single device and that the types of these device can to include, for example, optical inspection tools, review tools, yield control tools, FAB control device and the like.

Conveniently, the CD-SEM 20 determines one or more structural elements as reference structural elements. The definition can be responsive to the location of these structural elements, to the shape of the structural elements and the like. The selection can also be responsive to the slope of the sidewalls of these structural elements and can also be responsive to process variations that affect the shape of the structural elements. For example, the structural element can be selected near the edge of the wafer, near the center of the wafer, at locations that are remote from the edges of the wafer, in various locations that are known to he prone to inaccuracies, and the like. Said knowledge can be responsive to the design of the dies, to manufacturing limitations, to the process window and the like.

Figure 4:
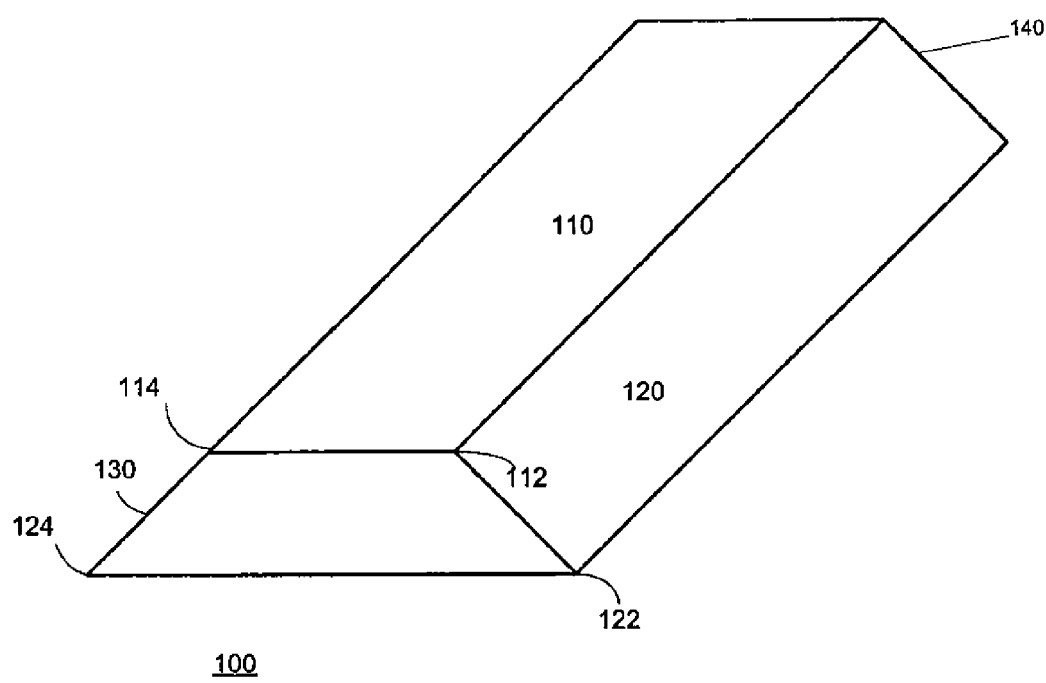
FIGS. 4-5 illustrate reference structural elements and milled reference structural elements.

Assuming, for simplicity of explanation, that a single structural element such as reference structural element 100 of FIG. 4 is selected. This reference structural element 100 is a line that has an upper portion such as line top 110, a lower portion such as a line bottom 120 and two sidewalls 130 and 140. The line top 110 extends between a right line top point 112 and a left line top point 114. The line bottom 120 extends between a right line bottom point 122 and a left line bottom point 124.

It is noted that FIG. 4 illustrates an ideal structural element. Typically, the structural element has a shape that substantially resembles the structural element of FIG. 5.

Conveniently, each of systems 10-10" is capable of defining a reference structural element, milling the reference structural element; measure an upper portion and a lower portion of the milled reference element, determining a relationship between an upper portion of a milled reference structural element and between a lower portion of the milled reference structural element; and defining a calibration parameter in response to the relationship. This calibration parameter can be used in measurements, such as non-destructive measurements, critical dimension measurements and the like.

It is noted that the calibration parameter that is defined based upon measurement of one sample can be used in measurements of other samples. It is also noted that the calibration parameter can be updated in response to various measurements of other miller reference structural elements or other measurements of non-milled structural elements.

Conveniently, each of systems 10-10" can generate an initial measurement of the upper portion of the reference structural element before the reference structural element is milled. Conveniently, said systems can utilize this initial measurement during the measurement of the upper portion and/or lower portion of the milled structural element. The initial measurement can be used to reduce the uncertainty introduced by the manufacturing process of the reference structural measurement and especially reduce the uncertainties introduces by the milling process.

Figure 5:
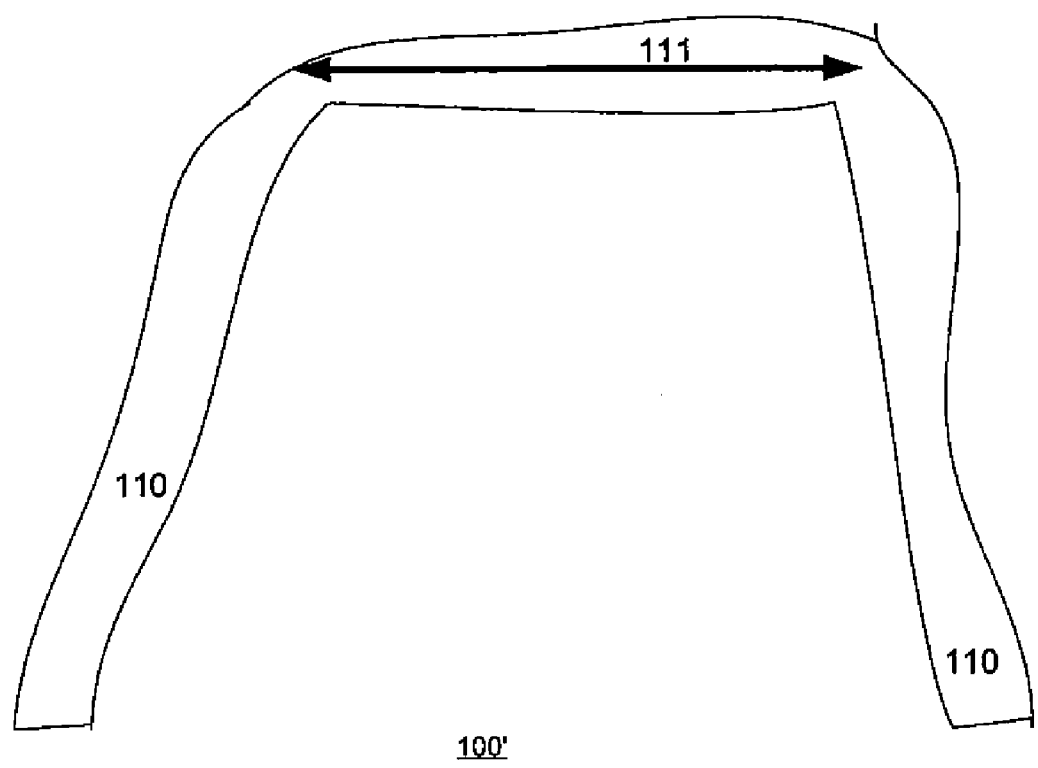

FIG. 5 illustrates a milled reference structural element 100'.

The reference structural element 100 was milled to provide the milled reference structural element 100'. As can be seen, due to the milling process the shape of the cross section of the reference structural element was deformed. The deformation included uneven removal of particles as well as deposition of various gases and materials during the milling process.

The initial measurement of the upper portion 110 allows to define an upper measurement of the milled reference structural element.

It is noted that in some cases the manufacturing process of the structural element introduces uncertainties. For example the sidewall of the structural element can be oriented in relation to an imaginary axis that is parallel to the line. Milling such a reference structural element can provide unclear sidewalls. Thus, instead of receiving a well defined border line representative of the sidewall a region, the milling can expose a line that is not well defined and that is not actually the border line of the reference structural element. Such an uncertainly area is illustrates by region 111.

It is noted that the system can define the dimension of a certain portion even at the presence of such an uncertainty and use this dimension in additional measurements, thus increasing the repetitiveness of the measurements.

When using charged particle beams that have a diameter that is smaller or slightly larger than the width of the sidewall of the structural element, the detection signals that are received from scanning the structural element differ from the actual shape of the structural element.

Usually, the width of a structural element is determined by analyzing a curve that represents the sequence of detection signals. Each point of the curve is associated with a certain height. One method includes calculating the first derivative of the curve, finding a maximal derivative point for each sidewall and defining a sidewall top point and a sidewall bottom point in relation to that maximal derivative point. The top and bottom sidewall points can be characterized by their derivatives values or by their height in relation to height of the maximal derivative point.

Figure 6:
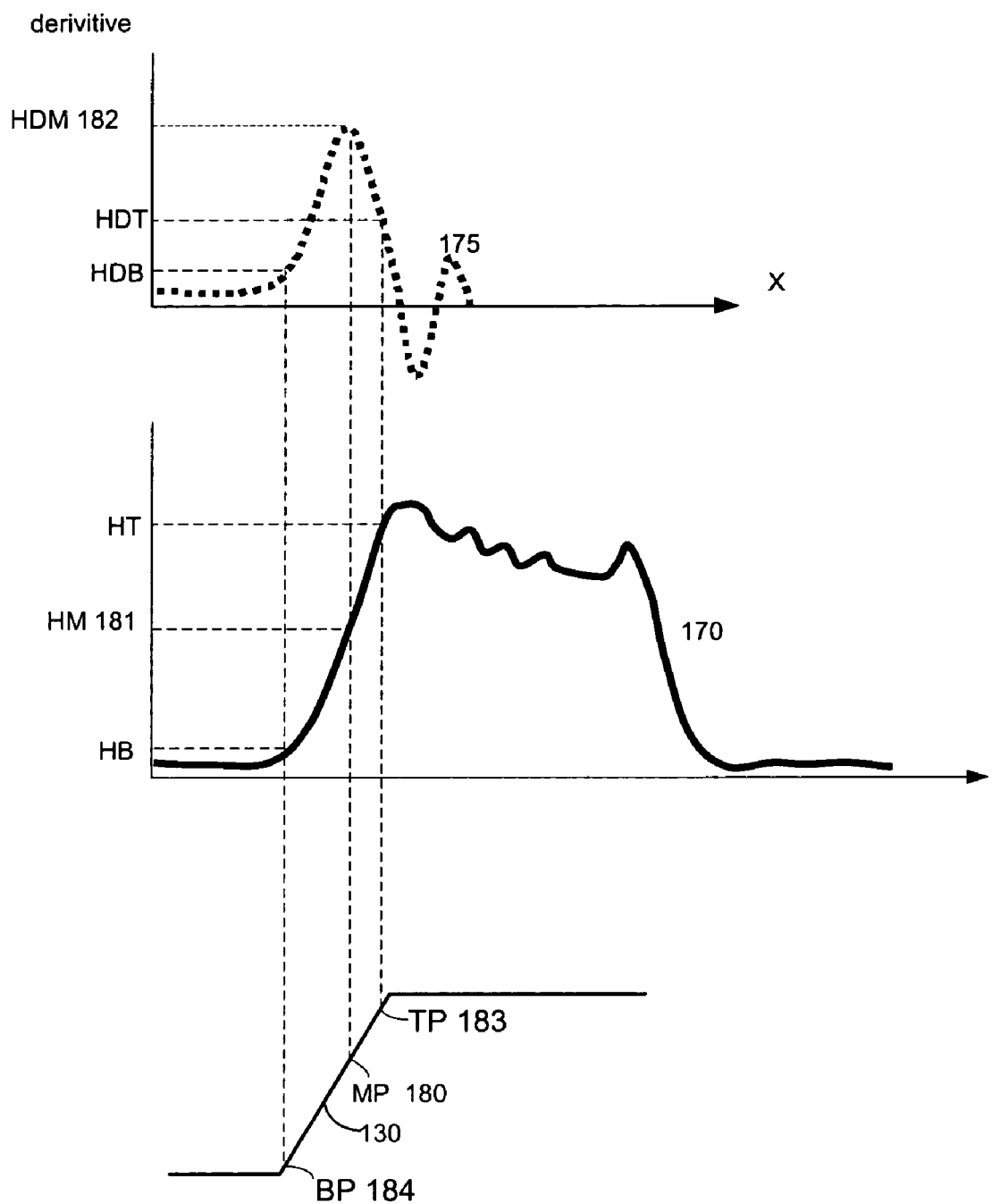
FIG. 6 illustrates a left sidewall of a structural element, a curve representative of multiple detection signals generated as a result of scanning that left sidewall, and a derivative of the curve, according to an embodiment of the invention.

FIG. 6 illustrates a left sidewall 130 of a structural element 100, a curve 170 representative of multiple detection signals generated as a result of scanning that left sidewall, and a derivative 175 of the curve, according to an embodiment of the invention. The maximal derivative point of the left sidewall is referred to as MP 180. It has a height value of HM 181 and a derivative value of HDM 182. The sidewall top point TP 183 can have a value of HT, whereas HT is a function of HM or a function of HDM or a function of both HM and HDM. The sidewall bottom point BP 184 can have a value of HB, whereas HB is a function of HM or a function of HDM or a function of both HM and HDM. The calibration parameter can be responsive to any combination of at least two of the following: HT, HB, HDT and HDB.

For example, assuming that the top sidewall point is is selected as a point in whitch HDT=K1*HDM, and the bottom sidewall point is selected as a point in whitch HDB=K2*HDM then the calabration parameter can be K1/K2. Whereas K1 and K2 are positive numbers.

According to an embodiment of the invention the calibration parameter can be a function that maps a dimention of an upper portions of a structural element to its lower portion.

For example, is the width of upper portion the milled reference structural element is TM, the width of the lower portion of the milled reference structural element is BW, and the width of a top portion of a measured structural element is T then the width (B) of the bottom portion of that measured structural element can be calculated according to any of the following equations: B=T*(BW/TW); B=b1*T*(BW/TW)+b2; B=(T−TW)*b3+BW*b4, Wherein b1-b4 are coefficients.

Figure 7:
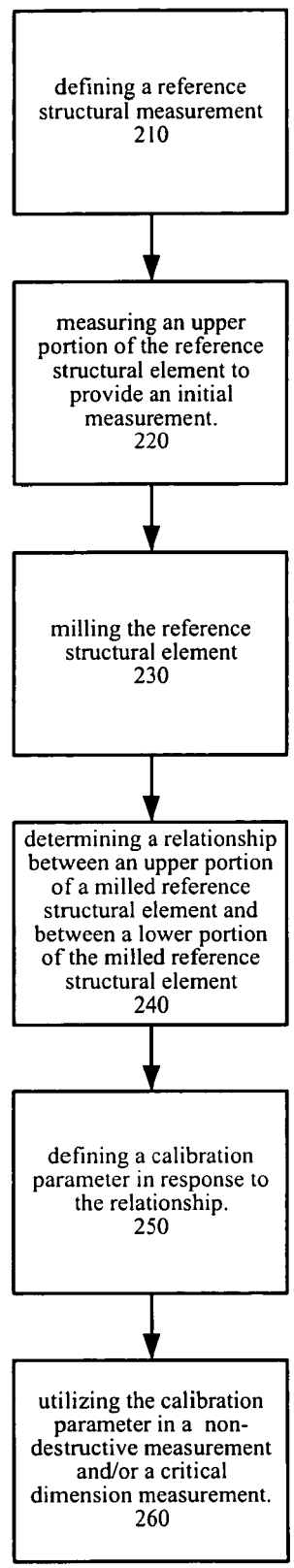
FIG. 7 is a flow chart of a method according to an embodiment of the invention.

FIG. 7 is a flow chart of method 200 for calibrating a metrology tool, according to an embodiment of the invention. For simplicity of explanation, this flow chart describes a method during which a single reference structural element is defined and milled, but this is not necessarily so. For example, this method can include determining a relationship between multiple (N) upper portions of at least one (M) reference structural element and between multiple lower portions of at least one reference structural element. M can equal N or be smaller than N.

Method 200 starts by stage 210 of defining a reference structural measurement.

Stage 210 is followed by stage 220 of measuring an upper portion of the reference structural element to provide an initial measurement.

Stage 220 is followed by stage 230 of milling the reference structural element.

Stage 230 is followed by stage 240 of determining a relationship between an upper portion of a milled reference structural element and between a lower portion of the milled reference structural element. Conveniently, this stage includes defining a dimension of the upper portion in response to the initial measurement.

Stage 240 is followed by stage 250 of defining a calibration parameter in response to the relationship.

Stage 250 is followed by stage 260 of utilizing the calibration parameter in a non-destructive measurement and/or a critical dimension measurement.

The present invention can be practiced by employing conventional tools, methodology and components. Accordingly, the details of such tools, component and methodology are not set forth herein in detail. In the previous descriptions, numerous specific details are set forth, such as shapes of cross sections of typical lines, amount of deflection units, etc., in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A method comprising:
    determining a relationship between an upper portion of a milled reference structural element and between a lower portion of the milled reference structural element;
    defining a calibration parameter in response to the relationship; and
    calibrating a metrology tool with said calibration parameter.

2. The method of claim 1 further comprising utilizing the calibration parameter in a non-destructive measurement.

3. The method according to claim 1 further comprising utilizing the calibration parameter in a critical dimension measurement.

4. The method according to claim 1 wherein the stage of determining is preceded by: (i) a stage of measuring an upper portion of the reference structural element to provide an initial measurement, and (ii) a stage of milling the reference structural element.

5. The method according to claim 4 wherein the stage of determining a relationship comprises defining a dimension of the upper portion in response to the initial measurement.

6. The method according to claim 1 further comprising determining a relationship between multiple upper portions of at least one reference structural element and between multiple lower portions of at least one reference structural element.

7. A metrology system comprising:
    a miller adapted to mill a reference structural element; and a
    measurement device adapted to determine a relationship between an upper portion of a milled reference structural element and between a lower portion of the milled reference structural element; wherein
    the metrology system is further adapted to define a calibration parameter in response to the relationship.

8. The metrology tool of claim 7 wherein the measurement device is adapted to utilize the calibration factor during a non-destructive measurement.

9. The system according to claim 7 wherein the measurement device is adapted to measure a critical dimension of a structural element.

10. The system according to claim 7 wherein the measurement device is adapted to generate an initial measurement of the upper portion of the reference structural element before the reference structural element is milled.

11. The system according to claim 10 wherein the measurement device determines the relationship in response to the initial measurement.

12. The system according to claim 7 wherein the measurement device is adapted to determine a relationship between multiple upper portions of at least one reference structural element and between multiple lower portions of at least one reference structural element.

* * * * *